E. R. CANTERBURY.
FRUIT GATHERING SLEEVE AND RECEPTACLE THEREFOR.
APPLICATION FILED JULY 26, 1915.
1,170,960.
Patented Feb. 8, 1916.
2 SHEETS—SHEET 1.
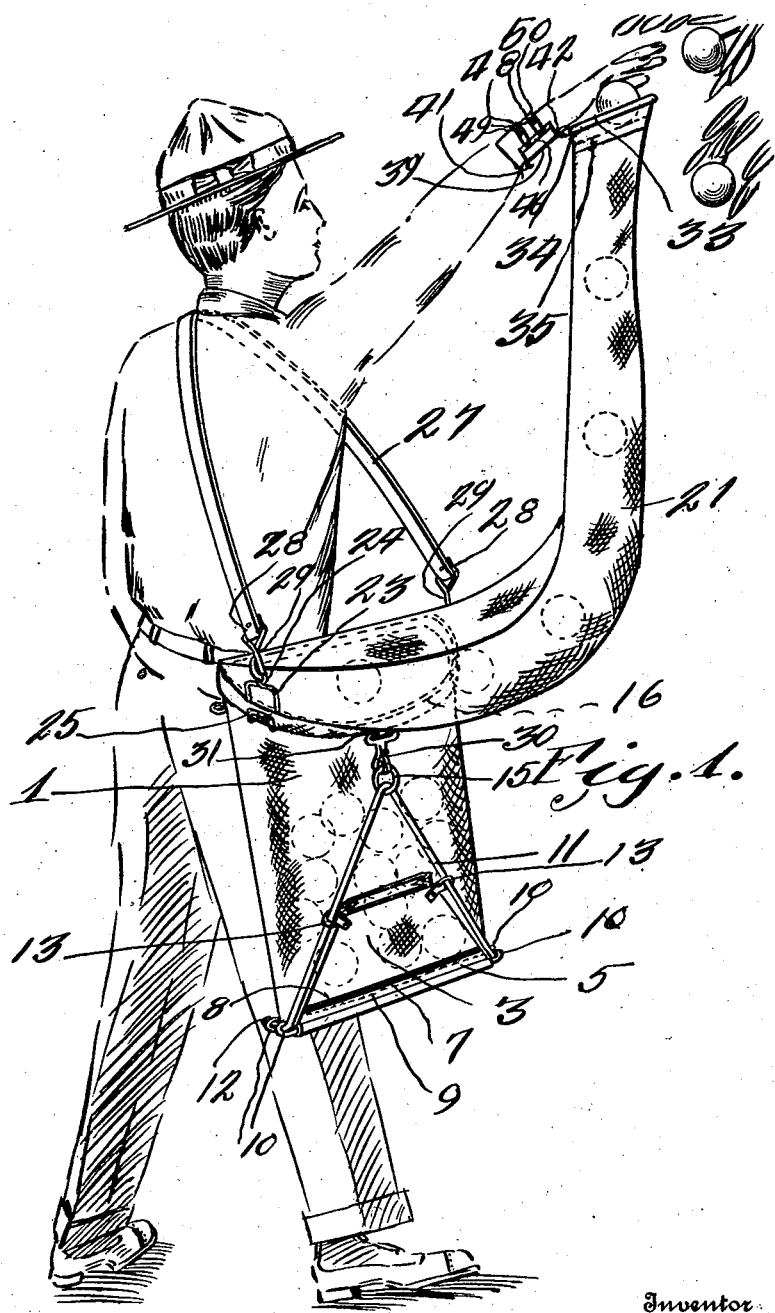

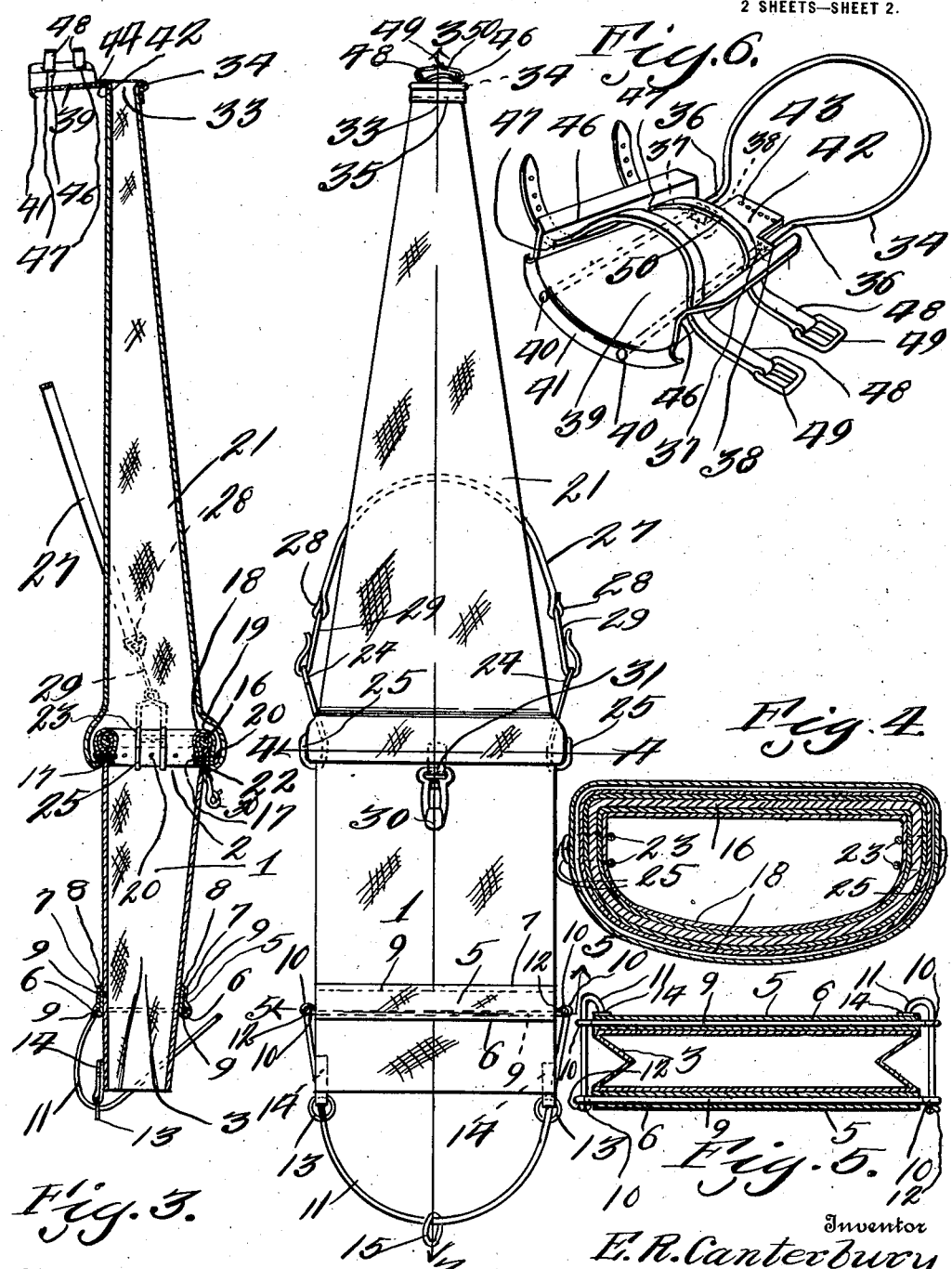

UNITED STATES PATENT OFFICE.

ELLISON ROBBINS CANTERBURY, OF REDLANDS, CALIFORNIA.

FRUIT-GATHERING SLEEVE AND RECEPTACLE THEREFOR.

1,170,960.

Specification of Letters Patent.

Patented Feb. 8, 1916.

Application filed July 26, 1915. Serial No. 42,000.

*To all whom it may concern:*

Be it known that I, ELLISON ROBBINS CANTERBURY, a citizen of the United States, residing at Redlands, in the county of San Bernardino and State of California, have invented a new and useful Fruit-Gathering Sleeve and Receptacle Therefor; and I do hereby declare the following to be a full, clear, and exact description of the invention, such as will enable others skilled in the art to which it appertains to make and use the same.

This invention relates to an improved fruit gathering sleeve and receptacle or container therefor, and an object of the invention is to provide a device of this nature, whereby the picking of fruit from the lower branches of the tree may be materially expedited by the picker.

In the use of the device, the receptacle is supported by means of a strap from the left shoulder, in the manner shown in Figure 1 of the drawing, and the sleeve (which is attached to the receptacle as shown) has its mouth end connected to the wrist of the picker, in such wise that when each piece of fruit is picked from its branch by the right hand of the picker, it is passed through the mouth, and falls through the sleeve or chute into the receptacle.

In practical fields the details of construction may necessitate alterations, falling within the scope of what is claimed.

The invention comprises further features and combinations of parts, as hereinafter set forth, shown in the drawings and claimed.

In the drawings: Fig. 1 is a view in perspective of the improved fruit gathering sleeve and receptacle, showing the application of the same. Fig. 2 is a side view of the gathering sleeve and receptacle, showing the bottom of the receptacle open. Fig. 3 is a sectional view on line 3—3 of Fig. 2. Fig. 4 is a sectional view on line 4—4 of Fig. 2. Fig. 5 is a sectional view on line 5—5 of Fig. 2. Fig. 6 is a detail perspective view of the device carried by the wrist of the picker or operator, for supporting the mouth end of the gathering sleeve or chute.

Referring more especially to the drawings, 1 designates a suitable sack constructed from canvas or other fabric material. This sack, as shown has upper and lower open ends 2 and 3. Upon each side of the sack upon its exterior and a little above the lower open end 3 a strip of fabric or canvas 5 (which is folded longitudinally upon itself to form a loop 6) has its adjacent parts 7 and 8 stitched at 9 to the sack. Arranged in each fold or loop 6 is a rod 9, each end of which is turned into an eye 10. A piece of rope 11 to form a loop is provided, and the ends of this rope or loop are anchored in the eyes 10 of one of the rods 9 by knotting the ends of the rope as shown at 12. The rope 11 also passes through the eyes of the other rod 9, and through the eyes or rings 13, which are attached at 14 to one of the sides adjacent its lower edge portion of the sack. The loop of the rope 11 has a ring 15, the purpose of which will appear later. The upper edge portion of the open end 2 of the sack is folded over the metallic ring or band, or hoop 16 (which is of a shape as shown in Figs. 1 and 4) and is stitched as shown at 17. To protect the canvas or fabric which is folded and stitched to the hoop or band, a strip of heavy leather 18 is bent upon itself as shown at 19 over the canvas or fabric of the band, and has its opposite sides riveted together as shown at 20. The fruit gathering sleeve 21 has its lower edge portion upwardly and inwardly inturned as shown at 22 between one side of the leather strip 18 and the fabric of the sack, and is also stitched at 17 to the fabric of the sack. However, the rivets 20 pass through both sides of the leather and through the canvas or fabric of the sack, and through the upwardly and inwardly inturned part 22 of the sleeve, thereby affording a secure connection between the sack and the sleeve. Bails 23 having eyes 24 are provided. The arms of the bails 23 pass through the fabric of the sleeve, and are formed into hooks 25 engaging about the leather upon the band or hoop, thereby holding the bails rigidly in place. These bails are carried at diametric sides of the band or hoop. A shoulder strap 27 is provided having loops 28 at its ends, to which loops the links 29 are connected. The links 29 are in turn connected to the eyes 24 of said bails, so that by placing the shoulder strap 27 to engage the left shoulder of the picker or operator, the sack or receptacle may be supported upon the picker or operator in the manner shown in Fig. 1. A suitable snap hook 30 is carried by the sack or receptacle upon its outer face and adjacent the band or hoop, by means of the leather loop 31.

When the sack is in use, the lower portion thereof immediately below the rods 10 is folded upon itself, and the ring 15 of the loop or rope 11 is connected to the snap hook 30, thereby holding the lower portion of the sack or receptacle closed. However, when the sack or receptacle is filled, the ring 15 may be disengaged from the snap hook, and owing to the rope 11 being capable of sliding through the eyes of one of the rods 9 and through the eyes 13, the sack or receptacle will automatically open or spread at its lower portion incident to the weight of the fruit. After the sack or receptacle is emptied, the lower portion thereof may be again folded, so as to close the lower end of the sack, until it is filled again. The rods 9 constitute stiffening means, so that when the opposite sides of the sack are folded, there is no possible way for the fruit to force its way between the sides.

It is to be noted that the sleeve tapers to somewhat of a contracted mouth 33 at the upper end of the sleeve. The fabric of the mouth end of the sleeve is folded over a partial ring 34, and stitched at 35. The ring 34 has arms 36, which pass through eyes or apertures 37 of the lugs 38 of the forward portion of the plate 39, which is partially curved in cross section. The arms 36 extend adjacent the under face of the plate 39, and have their ends riveted, soldered or otherwise fixed at 40 in the flange 41 at the rear edge portion of the plate 39. The plate 39 has an extension 42 provided with a row of closely arranged apertures 43. Where the fabric of the mouth end of the sleeve folds over the ring 34, it is whipped securely to the ring, by means of a suitable thread or cord 44, which cord or thread constitutes means for stitching a part of the fabric of the mouth end of the sleeve to the extension 42, the thread or cord passing through the apertures or perforations 43. The opposite longitudinal side portions of the plate 39 have upwardly and outwardly extending flanges 46 provided with slots or openings 47, through which the straps 48 pass. The straps 48 have suitable buckles 49, to receive and connect to the other ends of the straps, under the plate 39, the loop portions 50 of the straps engaging over the wrist of the right hand of the operator or picker, in the manner shown in Fig. 1, thereby connecting the plate 39 to the wrist. As before stated, the picker or operator detaches the fruit with the right hand, and drops the same through the mouth end of the sleeve, after which the fruit falls by gravity through the sleeve into the sack or receptacle, which when it becomes filled may be easily emptied in the manner heretofore set forth.

The invention having been set forth, what is claimed as new and useful is:—

A fruit gathering sleeve having a mouth end at its upper portion, means for connecting the mouth end to the wrist of an operator, the lower end of the sleeve terminating in a receptacle with its lower end opened, the opposite sides of the receptacle slightly above the lower open end of the receptacle having stiffening rods, each having eyes at both ends, a rope folded upon itself to form a loop and having its end portions passing through the eyes of one rod and through the eyes of the other rod, and being knotted at the extremities of said ends upon the outer portions of the eyes of one of the rods, to hold the two rods adjacent each other when the lower portion of the receptacle is bolted upon itself adjacent said rods, the loop of the rope having detachable connections with the upper part of the receptacle, to hold the receptacle folded adjacent said rods, the extreme lower edge portion of the receptacle having connections with the opposite side of the rope to hold the receptacle securely folded.

In testimony whereof I have signed my name to this specification in the presence of two subscribing witnesses.

ELLISON ROBBINS CANTERBURY.

Witnesses:
 W. T. PLANO,
 B. A. SMALL.